US008846775B2

(12) United States Patent
Mager et al.

(10) Patent No.: US 8,846,775 B2
(45) Date of Patent: Sep. 30, 2014

(54) PROCESSES FOR PRODUCING POLYURETHANE FOAMS CONTAINING ALKOXYSILANE FUNCTIONAL POLYMERS AND USES THEREFOR

(75) Inventors: Michael Mager, Leverkusen (DE); Michael Ludewig, Leverkusen (DE); Mathias Matner, Neuss (DE)

(73) Assignee: Bayer MaterialScience AG (DE)

( * ) Notice: Subject to any disclaimer, the term of this patent is extended or adjusted under 35 U.S.C. 154(b) by 813 days.

(21) Appl. No.: 12/170,522

(22) Filed: Jul. 10, 2008

(65) Prior Publication Data
US 2009/0018228 A1 Jan. 15, 2009

(30) Foreign Application Priority Data
Jul. 11, 2007 (DE) .......................... 10 2007 032 342

(51) Int. Cl.
| C08G 18/08 | (2006.01) |
|---|---|
| C08G 18/48 | (2006.01) |
| C08G 18/71 | (2006.01) |
| C08K 5/00 | (2006.01) |
| C08L 83/00 | (2006.01) |
| C08G 101/00 | (2006.01) |
| C08K 3/00 | (2006.01) |
| C08K 5/5465 | (2006.01) |

(52) U.S. Cl.
CPC .......... *C08G 18/718* (2013.01); *C08G 18/4837* (2013.01); *C08K 5/0016* (2013.01); *C08L 83/00* (2013.01); *C08G 2101/00* (2013.01); *C08K 3/0033* (2013.01); *C08K 5/5465* (2013.01)
USPC ........... 521/170; 521/155; 521/162; 521/174; 528/29; 528/69; 525/460

(58) Field of Classification Search
USPC .............. 521/170, 174, 162, 155; 528/29, 69; 525/460
See application file for complete search history.

(56) References Cited

U.S. PATENT DOCUMENTS

| 3,627,722 | A | * | 12/1971 | Seiter ........................... 524/869 |
|---|---|---|---|---|
| 5,990,257 | A | * | 11/1999 | Johnston et al. ................ 528/28 |
| 6,013,691 | A | * | 1/2000 | Braun et al. ................... 521/130 |
| 2004/0072921 | A1 | | 4/2004 | Stanjek et al. |
| 2005/0119436 | A1 | * | 6/2005 | Ziche et al. ...................... 528/29 |
| 2005/0234144 | A1 | | 10/2005 | Bachon et al. |
| 2006/0084711 | A1 | | 4/2006 | Stanjet et al. |
| 2006/0111505 | A1 | | 5/2006 | Schindler et al. |
| 2006/0148921 | A1 | | 7/2006 | Stanjek et al. |
| 2007/0055035 | A1 | * | 3/2007 | Ludewig et al. ................ 528/29 |
| 2009/0018480 | A1 | * | 1/2009 | Mager et al. .................... 602/46 |
| 2009/0030145 | A1 | * | 1/2009 | Johnston et al. .............. 524/590 |
| 2010/0036050 | A1 | * | 2/2010 | Iwa et al. ....................... 524/588 |

FOREIGN PATENT DOCUMENTS

| DE | 2238741 | 2/1994 |
|---|---|---|
| DE | 19653388 | 6/1998 |
| EP | 0946629 B1 | 10/1999 |
| EP | 1098920 B1 | 5/2001 |
| GB | 1422884 A | 1/1976 |
| WO | WO-02/066532 A1 | 8/2002 |
| WO | WO-2004/022618 | 3/2004 |
| WO | WO-2004/046218 A1 | 6/2004 |
| WO | WO-2004/092259 A1 | 10/2004 |
| WO | WO-2004/104078 A1 | 12/2004 |
| WO | WO-2007/037824 | 4/2007 |
| WO | WO-2007/050426 | 5/2007 |

* cited by examiner

Primary Examiner — Michael Pepitone
(74) Attorney, Agent, or Firm — Drinker Biddle & Reath LLP

(57) ABSTRACT

Processes comprising: (a) providing a composition comprising at least one silane-terminated polyurethane preploymer prepared by a process comprising: reacting (A) at least one polyether having a number average molecular weight (Mn) of 2000 to 8000 g/mol, and comprising 10 to 30 wt % ethylene oxide units based on all alkylene oxide units in the polyether; with (B) at least one isocyanate and alkoxysilane group-containing compound of the formula (I):

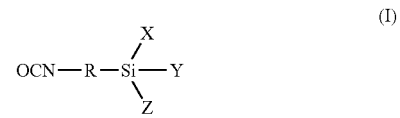

wherein each of X, Y, and Z independently represents a $C_1$-$C_8$ alkyl or a $C_1$-$C_8$ alkoxy residue, with the proviso that at least one of X, Y, and Z represents a $C_1$-$C_8$ alkoxy group; and wherein R is an at least bifunctional, organic residue; (b) foaming the composition, and (c) curing the foamed composition in the presence of water; and uses of polyurethane foams prepared thereby.

20 Claims, No Drawings

PROCESSES FOR PRODUCING POLYURETHANE FOAMS CONTAINING ALKOXYSILANE FUNCTIONAL POLYMERS AND USES THEREFOR

BACKGROUND OF THE INVENTION

The production of polyurethane foams based on alkoxysilane-terminated prepolymers has been described. Thus, for example, in European Patent Publication No. EP 946 629 B1, the entire contents of which are incorporated herein by reference, a foam formulation is described in principle which contains a silane functional prepolymer as a binder. However, such high molecular-weight prepolymers based only on polypropylene oxide are not particularly easy to foam and require for this purpose either special complex application equipment (e.g., FoamMix® from Nordson) or else, as explained in the aforementioned reference, complex formulations with numerous additives, which significantly reduce the viscosity of the system among other things. Although ethylene oxide-containing polyethers are mentioned in the patent specification as possible feedstocks, the particular suitability of these raw materials and details concerning their effective use was not appreciated or described.

European Patent Publication No. EP 1 098 920, the entire contents of which are incorporated herein by reference, describes a similar system based on a distinctly low molecular-weight, silane-terminated polyurethane. However, low molecular-weight, silane-terminated prepolymers of this type contain large quantities of very expensive functional silanes, which also leads to a significantly extended rate of curing (about 24 hours, according to examples 2 and 3 of the reference).

This problem of the low rate of curing was addressed in International Patent Publication No. WO2002/066532, the entire contents of which are incorporated herein by reference, by using alkoxysilane-terminated polyurethanes which were produced with alpha-amino- or alpha-isocyanatosilanes. However, the use of these building blocks, which are particularly reactive owing to their C-1 spacer between silane and functional group, is very complex precisely because of this high reactivity, since premature curing and side reactions have to be avoided, which places high demands on purity and freedom from water of the formulation ingredients and also makes special and expensive additives necessary. Variants of this concept are described in International Patent Publication No. WO2004/092259 and International Patent Publication No. WO2004/104078, the entire contents of each of which are incorporated herein by reference.

In German Patent Publication No. DE 2238741, as well as in International Patent Publication No. WO2004/046218, the entire contents of which are incorporated herein by reference, silane-terminated polymeric isocyanates are described which are suitable for the production of rigid foams. However, the considerable quantity of expensive functional silanes needed, which cause curing to proceed only slowly, is also a disadvantage.

BRIEF SUMMARY OF THE INVENTION

The present invention relates, in general to processes for the production of particularly readily foaming and rapidly curing polyurethane foams based on polyethers modified with isocyanatosilanes, which have an average molecular weight (Mn) between 2000 and 8000 g/mol and which, in addition to the main component polypropylene oxide, also contain a proportion of 10-35 wt. % of polyethylene oxide.

The various embodiments of the present invention provide rapidly curing and particularly readily foaming, silane-crosslinking polyurethane foams.

The present inventors have surprisingly discovered that it is possible to provide rapidly curing and particularly readily foaming, silane-crosslinking polyurethane foams by the use of polyethers modified with isocyanatosilanes, which are based on polyethers having an average molecular weight (Mn) between 2000 and 8000 g/mol and which, in addition to the main component polypropylene oxide, also contain a proportion of 10-30 wt. % of polyethylene oxide, as a binder for polyurethane foam formulations.

The present invention thus provides a process for the production of polyurethane foams cured by silane condensation: in which a composition containing at least one silane-terminated polyurethane prepolymer, which prepolymer is obtainable by reacting: (A) at least one polyether with an average molecular weight (Mn) of 2000 to 8000 g/mol, containing 10 to 30 wt. % EO units, based on all the alkylene oxide units contained in the polyether, with (B) at least one isocyanate and alkoxysilane group-containing compound of the formula (I)

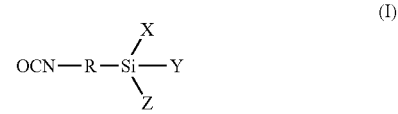

in which X, Y, and Z independently of one another are $C_1$-$C_8$ alkyl or $C_1$-$C_8$ alkoxy residues, at least one of the residues being a $C_1$-$C_8$ alkoxy group, and R is any, at least bifunctional, organic residue, preferably an alkylene radical with 1 to 8 carbon atoms; is foamed; optionally applied on to a suitable substrate before, during or after foaming; and cured in the presence of water.

One embodiment of the present invention includes processes which comprise: (a) providing a composition comprising at least one silane-terminated polyurethane prepolymer prepared by a process comprising: reacting (A) at least one polyether having a number average molecular weight (Mn) of 2000 to 8000 g/mol, and comprising 10 to 30 wt. % ethylene oxide units based on all alkylene oxide units in the polyether; with (B) at least one isocyanate and alkoxysilane group-containing compound of the formula (I):

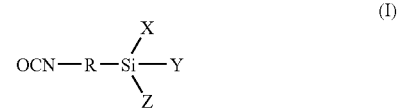

wherein each of X, Y, and Z independently represents a $C_1$-$C_8$ alkyl or a $C_1$-$C_8$ alkoxy residue, with the proviso that at least one of X, Y, and Z represents a $C_1$-$C_8$ alkoxy group; and wherein R is an at least bifunctional, organic residue; (b) foaming the composition, and (c) curing the foamed composition in the presence of water.

Additional other embodiments of the present invention includes foams obtainable by the processes according to the invention, as well as uses therefor.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a polyurethane" herein or in the appended claims can refer to a single polyurethane or more than one polyurethane. Additionally, all numerical values, unless otherwise specifically noted, are understood to be modified by the word "about."

Silane-terminated polyurethanes suitable for use in the processes according to the various embodiments of the present invention can be obtained by reacting particular polyether polyol(s) with an isocyanatosilane.

The particular polyether polyol(s) (A) are essential to the processes according to the various embodiments of the present invention. Suitable polyether polyols for use in processes according to the present invention have a molecular weight (Mn) of 2000 g/mol to 8000 g/mol, preferably of 3000 g/mol to 5000 g/mol, and are the addition products, which are known per se, of propylene oxide and ethylene oxide to a starter molecule. These polyether polyols which can be used according to the invention have a proportion of 10-30 wt. %, preferably 10-20 wt. % of polyethylene oxide incorporated by polymerization, based on the total proportion of alkylene oxide in the polyether. It is irrelevant here whether the ethylene oxide is contained in the polyether in random distribution or blockwise, but distribution in blocks is preferred. It is particularly preferred if the ethylene oxide is polymerized on to a polypropylene oxide as an end block.

The alkoxylation with ethylene oxide and propylene oxide can take place with base catalysis or using double metal cyanide compounds (DMC compounds). All compounds known according to the prior art can be used as suitable starter molecules for the production of the polyether polyols, such as, e.g., water, butyl diglycol, glycerol, diethylene glycol, trimethylolpropane, propylene glycol, sorbitol, ethylenediamine, triethanolamine, 1,4-butanediol. Preferred starter molecules include water, ethylene glycol, propylene glycol, 1,4-butanediol, diethylene glycol and butyl diglycol.

In principle, all alkoxysilane group-containing monoisocyanates with a molecular weight of 140 g/mol to 500 g/mol are suitable as isocyanate and alkoxysilane group-containing compounds (B). In such molecules of formula (I)

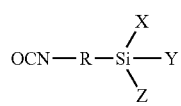

(I)

wherein X, Y and Z, independently of one another, signify $C_1$-$C_8$ alkyl or $C_1$-$C_8$ alkoxy residues, preferably $C_1$-$C_4$ alkyl or $C_1$-$C_4$ alkoxy residues and especially preferably methyl and ethyl or methoxy and ethoxy residues, at least one, preferably at least two of the residues being an alkoxy group. However, it is also conceivable to use cyclic alkoxysilanes in which X and Y are bridged with one another via a dialkoxy residue.

R denotes any, at least bifunctional, organic residue, preferably an alkylene radical with 1 to 8 carbon atoms and especially preferably an n-propyl residue.

Such isocyanate-containing di- and/or trialkoxysilanes are known in principle, and the following may be mentioned as examples: isocyanatomethyltrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane and 3-isocyanatopropylmethyldiethoxysilane. The use of 3-isocyanatopropyltrimethoxysilane is preferred here.

In the production of the silane-terminated polyurethane prepolymer used in the processes according to the invention by urethanization, 1.0 to 1.5 equivalents equivalents, preferably 1.0 to 1.2 equivalents, of the polyether (A) are used per equivalent of the isocyanate and alkoxysilane group-containing compound (B).

The urethanization of the components (A) and (B) may optionally be carried out using a catalyst. Suitable as these catalytically active compounds are urethanization catalysts known per se to the person skilled in the art, such as organotin compounds or amine catalysts. The following may be mentioned as examples of organotin compounds: dibutyltin diacetate, dibutyltin dilaurate, dibutyltin bisacetoacetonate and tin carboxylates, such as e.g. tin octoate. The said tin catalysts may optionally be used in combination with amine catalysts, such as aminosilanes or 1,4-diazabicyclo[2.2.2]octane. Dibutyltin dilaurate is particularly preferably used as urethanization catalyst.

In the processes according to the invention, the catalyst component, where used, is employed in quantities of 0.001 to 5.0 wt. %, preferably 0.001 to 0.1 wt. % and particularly preferably 0.005 to 0.05 wt. %, based on the solids content of the process product.

The urethanization of components (A) and (B) can be performed at temperatures of 20 to 200° C., preferably 40 to 120° C. and particularly preferably 60 to 100° C.

The reaction is generally continued until a complete conversion of the NCO groups of the compounds of component (B) is achieved. The course of the reaction can be monitored by suitable measuring instruments installed in the reaction vessel and/or by means of analyses of samples taken. Suitable methods are known to the person skilled in the art. These are, for example, viscosity measurements, measurements of the NCO content, the refractive index, the OH content, gas chromatography (GC), nuclear magnetic resonance spectroscopy (NMR), infrared spectroscopy (IR) and near infrared spectroscopy (NIR). The NCO content of the mixture is preferably determined by titration.

For the processes according to the invention, in addition to the binder, other formulation components such as adjuvants, catalysts, plasticizers, blowing agents and auxiliary substances and additives are generally also employed.

The adjuvants are nonionic, anionic, cationic or zwitterionic surfactants or mixtures of said surfactants, which are used in the compositions according to the invention to improve foam formation, foam stability or the properties of the resulting polyurethane foam. Preferred adjuvants are nonionic surfactants, particularly preferably nonionic surfactants based on polyether siloxanes.

All substances known per se from silicon chemistry which catalyze the hydrolysis and condensation of alkoxysilanes or silanol groups can, in principle, be added as catalysts. The following can be mentioned as examples: metal salts, metal complexes, organometallic compounds as well as acids and bases. The use of organic and inorganic acids or bases is preferred, particularly preferably the use of organic or inorganic acids, such as e.g. hydrochloric acid or p-toluenesulfonic acid.

The crosslinking reaction of the alkoxysilane groups of the silane-terminated polyurethane prepolymers with the formation of siloxane bridges can, in principle, take place in the presence of atmospheric moisture; however the addition of water to the composition according to the invention is preferred. If a catalyst is additionally used, this is preferably used in solution in the water to be added.

As a blowing agent, in the simplest case, air or nitrogen can be used, but of course all other blowing agents known per se from polyurethane chemistry can also be used to foam the composition according to the invention. For example, n-butane, i-butane, propane and dimethyl ether may be mentioned, as well as mixtures of the above.

As auxiliary substances and additives, it is possible to use e.g. thickeners or thixotropic agents, antioxidants, light stabilizers, plasticizers, pigments, fillers and/or flow control agents.

Preferred auxiliary substances and additives are fillers, particularly preferably inorganic fillers which can contribute to an improvement in the mechanical properties of the polyurethane foam according to the invention. For example, chalks and highly disperse silicas are suitable, particularly silicas produced by flame pyrolysis.

All natural or synthetic substances displaying sufficiently good compatibility with the polyurethane foam can be used as plasticizers. Examples of suitable plasticizers are camphor, esters of (aliphatic) dicarboxylic acids, e.g. of adipic acid, polyesters, particularly based on adipic, sebacic, azelaic and phthalic acid condensed with 1,3-butanediol, 1,4-butanediol or 1,6-hexanediol, as well as phosphoric acid esters, fatty acid esters and hydroxycarboxylic acid esters (e.g. based on citric acid, tartaric acid or lactic acid).

The compositions according to the invention typically contain, based on dry matter, 30 to 99.9 parts by weight of the silane-terminated polyurethane prepolymer, 0.1 to 20 parts by weight of the (foam) adjuvant and 0 to 50 parts by weight of other auxiliary substances and additives, particularly fillers and plasticizers. The compositions preferably contain, based on dry matter, 50 to 99.9 parts by weight of the silane-terminated polyurethane prepolymer, 0.1 to 15 parts by weight of the (foam) adjuvant and 10 to 40 parts by weight of auxiliary substances and additives, particularly fillers and plasticizers.

The blowing agent or blowing agent mixture is typically used in a quantity of 1 to 50 wt. %, preferably 5 to 40 wt. % and particularly preferably 5 to 20 wt. %, the sum of the components used adding up to 100 wt. %.

The mixing of the components can take place in any order.

Water is typically added in a quantity such that the molar ratio of alkoxysilane groups to water is less than or equal to 1 (excess water). The molar ratio is preferably less than or equal to 0.75, particularly preferably less than or equal to 0.55.

The foaming in the processes according to the various embodiments of the present invention can be carried out, for example, by shaking the composition, mechanical stirring at high speeds or by depressurizing a blowing gas. After or during foaming, the curing of the composition takes place, after which the desired polyurethane foam is obtained. Before complete curing, i.e., as long as the composition is still flowable, this can be applied on to a suitable substrate by common application techniques such as pouring or knife application.

Mechanical foaming can take place using any mechanical stirring, mixing and dispersing techniques. Air is generally introduced during this process, but nitrogen and other gases can also be used for this purpose.

The foam obtained in this way is applied on to a substrate or poured into a mould and dried during or immediately after foaming.

The application can take place e.g. by pouring or knife application, but other techniques which are known per se are also possible. A multi-layer application with optional intermediate curing steps is also possible in principle.

A satisfactory rate of curing of the foams is already observed at 20° C. For more rapid curing and fixing of the foams, however, higher temperatures of preferably more than 30° C. can also be used, e.g. with the aid of heating and drying equipment which is known per se, such as (circulating air) drying cabinets, hot air or IR lamps.

The application and curing can each be carried out batchwise or continuously, but an entirely continuous process is preferred.

In one embodiment of the present invention, the silane-terminated polyurethane prepolymer is mixed with the adjuvant and optionally other auxiliary substances and additives. After foaming the mixture, which can take place e.g. by mechanical introduction of air or another gas, the catalyst is added and the (foamed) mixture is applied on to a suitable substrate and finally cured in the presence of atmospheric moisture. To accelerate the curing of the foamed mixture, water can additionally be added, which preferably takes place together with the (dissolved) catalyst.

In another embodiment of the present invention, the silane-terminated polyurethane prepolymer is mixed with the adjuvant and optionally other auxiliary substances and additives and transferred into a suitable pressurized vessel, e.g. a spray can. The blowing agent is then added; during the application of the mixture on to a suitable substrate, foaming takes place and curing by atmospheric moisture.

In another embodiment of the present invention, the silane-terminated polyurethane prepolymer is mixed with the adjuvant and optionally other auxiliary substances and additives and transferred into a first chamber of a suitable pressurized vessel, e.g. a spray can, said spray can having at least 2 separate chambers. The catalyst, which is preferably mixed with a suitable quantity of water, is added to a second chamber of the pressurized vessel. The auxiliary substances and additives can also be admixed in the second chamber, but this is less preferred. The blowing agent is now added to one or both of the chambers and finally the two-component mixture is applied on to a suitable substrate, the foaming and curing taking place at the same time.

Before they are cured, the polyurethane foams typically have foam densities of 50 to 800 g/liter, preferably 100 to 500 g/liter, particularly preferably 100 to 250 g/liter (mass of all feedstocks [in g] based on the foam volume of one liter).

After drying, the polyurethane foams possess a microporous, at least partly open-pore structure with intercommunicating cells. The density of the cured foams is typically less than 0.4 g/cm$^3$, preferably less than 0.35 g/cm$^3$ and particularly preferably 0.01 to 0.2 g/cm$^3$.

The polyurethane foams have good mechanical strength and high elasticity. Typically, the values for the maximum stress are greater than 0.1 N/mm and the maximum elongation is greater than 100%. The elongation is preferably greater than 200% (determined in accordance with DN 53504).

The polyurethane foams can be both used as in-situ foams, e.g. for the sealing or fixing of window and door frames (assembly foam), and cured as block foams or molded foams, which can be bonded, laminated or coated in a further processing step. The application of the foam between two substrates to produce sandwich panels is also conceivable. Another area of application is the in-situ application of the foam to produce foamed seals.

The invention therefore also provides the use of the foams according to the invention as in-situ foams, block foams or molded foams.

The invention will now be described in further detail with reference to the following non-limiting examples.

EXAMPLES

All percentages refer to per cent by weight, unless otherwise specified.

The determination of the NCO contents in % was carried out by back titration with 0.1 mol/l hydrochloric acid after reaction with butylamine, based on DIN EN ISO 11909.

The ambient temperature of 23° C. prevailing at the time of carrying out the test is referred to as RT.

Abbreviations used and feedstocks:

| | |
|---|---|
| PO | Propylene oxide |
| EO | Ethylene oxide |
| DBTL | Dibutyltin dilaurate |
| Tegostab ® B 1048 | Polyether siloxane (Degussa, Düsseldorf, DE) |
| Aerosil ® 9200 | Highly disperse silica produced by flame pyrolysis (Degussa, Düsseldorf, DE) |
| Mesamoll ® | Plasticizer based on an alkylsulfonic acid ester (Lanxess, Leverkusen, DE) |

Production of the Silane-Terminated Prepolymer 1 (STP 1, According to the Invention):

A mixture of 2003.6 g of a bifunctional, ethylene oxide-containing polyether (OH number 28, molecular weight 4000 g/mol, PO/EO ratio=6.5 corresponding to 13 wt. % EO), 214.3 g 3-isocyanatotrimethoxysilane and 133 μl DBTL were heated to 60° C. with stirring until the NCO content was 0.0%.

Production of the Silane-Terminated Prepolymer 2 (STP 2, Not According to the Invention):

A mixture of 2000 g of a bifunctional polyether not containing ethylene oxide (OH number 28, molecular weight 4000 g/mol, 100% PO), 214.3 g 3-isocyanatotrimethoxysilane and 133 μl DBTL were heated to 60° C. with stirring until the NCO content was 0.0%.

Example 1

Production of a Foam Using Base Catalysis 117.5 g of STP 1 and 3.8 g of Tegostab® 1048 were blended in a plastic beaker using a hand mixer and foamed to a volume of approx. 300 ml in 10 min. Then, 2.5 g of potassium hydroxide solution (1.25 mol/l) were added, after which curing took place within 20 s. A white foam was obtained.

Example 2

Production of Foams Using Acid Catalysis a) 117.5 g of STP 1 and 3.8 g of Tegostab® B 1048 were blended in a plastic beaker using a hand mixer and foamed to a volume of approx. 300 ml in 10 min. Then, 2.5 g of a 5% aqueous solution of p-toluenesulfonic acid were added, after which curing took place within 100 s. A white foam was obtained.

b) The test as described in a) was carried out with 2 g of a 20% aqueous solution of p-toluenesulfonic acid, with curing to a white foam taking place after only 50 s.

Example 3

Foam with Filler and Plasticizer

Using a high-speed mixer, 50 g of Aerosil® R 9200 were first dispersed in 117.5 g of STP 1 (almost transparent dispersion). Then, 25 g of Mesamoll® and 3.8 g of Tegostab® B 1048 were added and finally the mixture was foamed to a volume of approx. 300 ml in 10 min in a plastic beaker using a hand mixer. After adding 2.5 g of a 5% aqueous solution of p-toluenesulfonic acid, curing to form a white foam was achieved within 20 s.

Comparative Example

Not According to the Invention: Production of a Foam 117.5 g of STP 2 and 3.8 g of Tegostab® B 1048 were blended in a plastic beaker using a hand mixer, as in examples 2 and 3. In contrast to the previous tests, no stable foam was obtained.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A process comprising:
  (a) providing a composition comprising at least one silane-terminated polyurethane preploymer prepared by a process comprising: reacting (A) at least one polyether having a number average molecular weight (Mn) of 2000 to 8000 g/mol, and comprising 10 to 30 wt. % ethylene oxide units based on all alkylene oxide units in the polyether; with (B) at least one isocyanate and alkoxysilane group-containing compound of the formula (I):

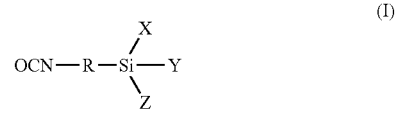

wherein each of X, Y, and Z independently represents a $C_1$-$C_8$ alkyl or a $C_1$-$C_8$ alkoxy residue, with the proviso that at least one of X, Y, and Z represents a $C_1$-$C_8$ alkoxy group; and wherein R is an at least bifunctional, organic residue, until a complete conversion of the NCO groups of the compounds of component (B) with component (A) is achieved;
  (b) foaming the composition, and
  (c) curing the foamed composition in the presence of water.

2. The process according to claim 1, wherein R represents an alkylene radical having 1 to 8 carbon atoms.

3. The process according to claim 1, further comprising applying the composition to a substrate before, during or after foaming.

4. The process according to claim 1, wherein the at least one polyether has a number average molecular weight (Mn) of 3000 to 5000 g/mol.

5. The process according to claim 2, wherein the at least one polyether has a number average molecular weight (Mn) of 3000 to 5000 g/mol.

6. The process according to claim 1, wherein the at least one polyether comprises 10 to 20 wt. % ethylene oxide units and 80 to 90 wt. % polypropylene oxide units based on all alkylene oxide units in the polyether.

7. The process according to claim 2, wherein the at least one polyether comprises 10 to 20 wt. % ethylene oxide units and 80 to 90 wt. % polypropylene oxide units based on all alkylene oxide units in the polyether.

8. The process according to claim 4, wherein the at least one polyether comprises 10 to 20 wt. % ethylene oxide units and 80 to 90 wt. % polypropylene oxide units based on all alkylene oxide units in the polyether.

9. The process according to claim 5, wherein the at least one polyether comprises 10 to 20 wt. % ethylene oxide units and 80 to 90 wt. % polypropylene oxide units based on all alkylene oxide units in the polyether.

10. The process according to claim 1, wherein each of X, Y, and Z independently represents a methoxy or ethoxy group.

11. The process according to claim 2, wherein each of X, Y, and Z independently represents a methoxy or ethoxy group.

12. The process according to claim 4, wherein each of X, Y, and Z independently represents a methoxy or ethoxy group.

13. The process according to claim 6, wherein each of X, Y, and Z independently represents a methoxy or ethoxy group.

14. The process according to claim 9, wherein each of X, Y, and Z independently represents a methoxy or ethoxy group.

15. The process according to claim 1, wherein the at least one isocyanate and alkoxysilane group-containing compound of the formula (I) comprises isocyanatopropyltrimethoxysilane or isocyanatopropyltriethoxysilane.

16. The process according to claim 2, wherein the at least one isocyanate and alkoxysilane group-containing compound of the formula (I) comprises isocyanatopropyltrimethoxysilane or isocyanatopropyltriethoxysilane.

17. The process according to claim 4, wherein the at least one isocyanate and alkoxysilane group-containing compound of the formula (I) comprises isocyanatopropyltrimethoxysilane or isocyanatopropyltriethoxysilane.

18. The process according to claim 6, wherein the at least one isocyanate and alkoxysilane group-containing compound of the formula (I) comprises isocyanatopropyltrimethoxysilane or isocyanatopropyltriethoxysilane.

19. The process according to claim 14, wherein the at least one isocyanate and alkoxysilane group-containing compound of the formula (I) comprises isocyanatopropyltrimethoxysilane or isocyanatopropyltriethoxysilane.

20. A polyurethane foam prepared by the process according to claim 1.

* * * * *